(12) United States Patent
Brahmaroutu

(10) Patent No.: US 7,603,500 B2
(45) Date of Patent: Oct. 13, 2009

(54) SYSTEM AND METHOD FOR ALLOWING COEXISTENCE OF MULTIPLE PCI MANAGERS IN A PCI EXPRESS SYSTEM

(75) Inventor: Surender Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 11/837,073

(22) Filed: Aug. 10, 2007

(65) Prior Publication Data

US 2009/0043941 A1 Feb. 12, 2009

(51) Int. Cl.
*G06F 13/00* (2006.01)
(52) U.S. Cl. .................... 710/104; 710/8; 709/220
(58) Field of Classification Search .......... 710/316, 710/104, 300, 1, 8, 10; 709/220; 370/357, 370/386
See application file for complete search history.

(56) References Cited

U.S. PATENT DOCUMENTS

| | | | |
|---|---|---|---|
| 7,099,969 B2 | 8/2006 | McAfee et al. | 710/107 |
| 7,304,940 B2 * | 12/2007 | Larsen et al. | 370/218 |
| 7,395,367 B2 * | 7/2008 | Boyd et al. | 710/316 |
| 7,529,860 B2 * | 5/2009 | Freimuth et al. | 710/8 |

* cited by examiner

*Primary Examiner*—Clifford H Knoll
(74) *Attorney, Agent, or Firm*—Hamilton & Terrile, LLP; Stephen A. Terrile

(57) ABSTRACT

A system and method that allows a plurality of SR-PCIMs to operate within a PCIe fabric. The system and method describe a master SR-PCIM election process and transfer of mastership from a master SR-PCIM to a standby SR-PCIM under certain conditions. The system and method leverage the PCI configuration space and PCI messages so that SR-PCIMs from multiple vendors can potentially interoperate.

18 Claims, 3 Drawing Sheets

SYSTEM AND METHOD FOR ALLOWING COEXISTENCE OF MULTIPLE PCI MANAGERS IN A PCI EXPRESS SYSTEM

BACKGROUND OF THE INVENTION

1. Field of the Invention

The present invention relates to the field of allowing coexistence of multiple PCI Managers in a PCI Express System.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is well known to provide information handing systems which include components that conform to a Peripheral Component Interconnect Express protocol. The Peripheral Component Interconnect Express (PCI Express or PCIe) protocol is rapidly establishing itself as the successor to the PCI protocol. When compared with PCI systems (i.e., legacy PCI), PCI Express systems provide higher performance, increased flexibility and scalability for next-generation systems, while maintaining software compatibility with existing PCI applications widely deployed in computer, storage, communications and general embedded systems.

One feature of the PCI Express protocol is IO virtualization. IO virtualization relates to the capability of an IO device to be used by more than on system image (e.g., by more than one operating system (OS)) executing on the same or different host processors.

It is known to provide a single root PCI manager (SR-PCIM). A SR-PCIM is defined in the PCI specification available from the Peripheral Component Interconnect Special Interest Group (PCI-SIG). More specifically, an IO virtualization (IOV) specification published by the PCI-SIG refers to system software that controls configuration, management and error handling of physical functions (PFs) and virtual functions (VFs). However, the IOV specification is silent on how to implement a SR-PCIM.

For example, the IOV specification does not set forth whether a SR-PCIM is implemented as a single entity or as multiple entities. The specification only defines the semantic requirements that SR-PCIM supports and the syntax and semantics of PCI Express extended configuration space fields which SR-PCIM uses to configure and manage IOV end points (EPs).

SUMMARY OF THE INVENTION

In accordance with the present invention, a system and method is set forth that allows a plurality of SR-PCIMs to operate within a PCIe fabric. More specifically, the system and method describes a master SR-PCIM election process and transfer of mastership from a master SR-PCIM to a standby SR-PCIM under certain conditions. The invention leverages PCI configuration space and PCI messages so that SR-PCIMs from multiple vendors can potentially interoperate.

More specifically, in one embodiment, the invention relates to a method for allowing coexistence of a plurality of peripheral component interconnect (PCI) managers in a PCI Express system which includes identifying one of the plurality of PCI managers as a Master PCI manager, operating the master PCI manager in a master mode of operation, and setting each other PCI manager of the plurality of PCI managers in a state chosen from an inactive state and a standby state.

In another embodiment, the invention relates to an apparatus for allowing coexistence of a plurality of peripheral component interconnect (PCI) managers in a PCI Express system which includes means for identifying one of the plurality of PCI managers as a master PCI manager, means for operating the master PCI manager in a Master mode of operation, and means for setting each other PCI manager of the plurality of PCI managers in a state chosen from an inactive state and a standby state.

In another embodiment, the invention relates to an information handling system which includes a processor and memory coupled to the processor. The memory stores a system for allowing coexistence of a plurality of peripheral component interconnect (PCI) managers in a PCI Express system. The system includes instructions executable by the processor for identifying one of the plurality of PCI managers as a master PCI manager, operating the master PCI manager in a master mode of operation, and setting each other PCI manager of the plurality of PCI managers in a state chosen from an inactive state and a standby state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
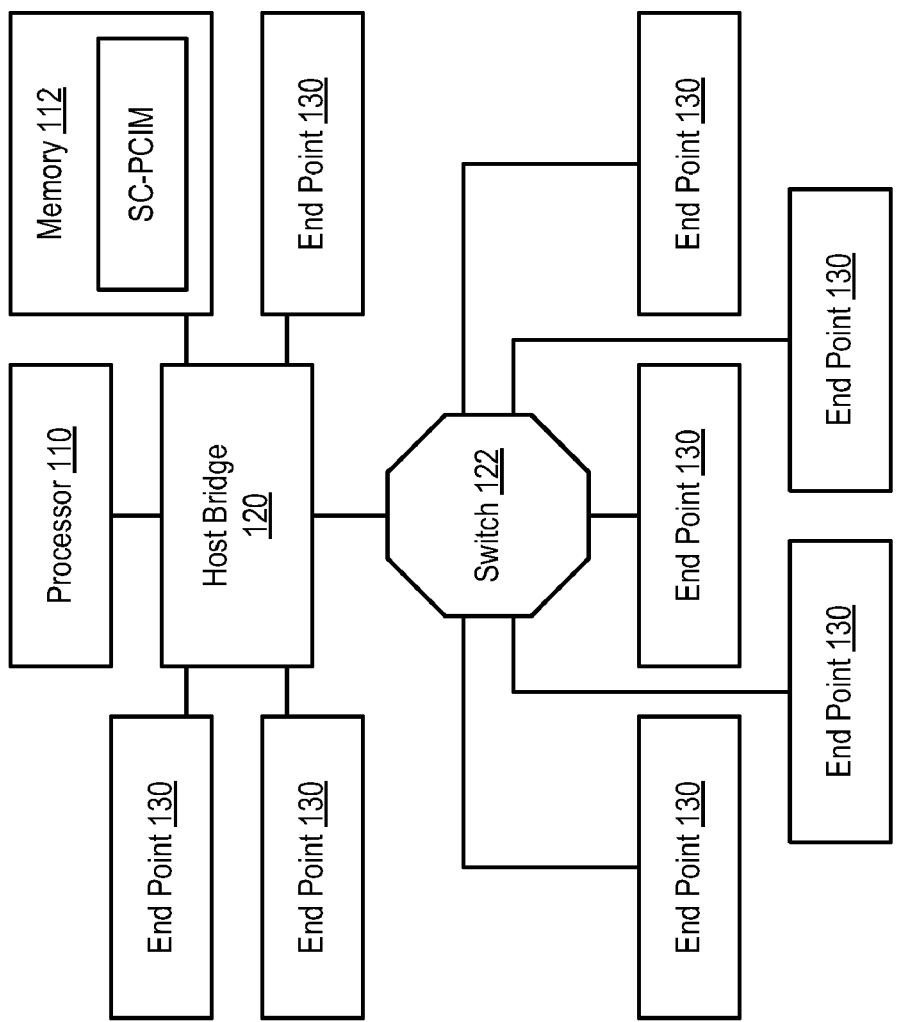
FIG. 1 shows a block diagram of an information handling system conforming to the PCI Express architecture.

FIG. 1 shows a block diagram of an information handling system 100 conforming to the PCI Express architecture. The information handling system 100 includes a processor 110, a memory 112 as well as a host bridge 120 and a switch 122. The information handling system also includes a plurality of end points 130. The host bridge 120 can include a memory bridge as well as an input output (IO) bridge. The memory 112 stores a single root PCI manager 140. The single root PCI manager (SR PCIM) 140 is executed by the processor 110. Instantiations of the SR PCIM 140 may also be executed by various other components of the information handing system 100. For example, one or more endpoints may also execute an instantiation of the SR PCIM 140. Also, the host bridge may also execute an instantiation of the SR PCIM 140. Also, the processor 110 may be executing as a plurality of virtual machines. Some or all of the plurality of virtual machines may also execute an instantiation of the SR PCIM 140.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
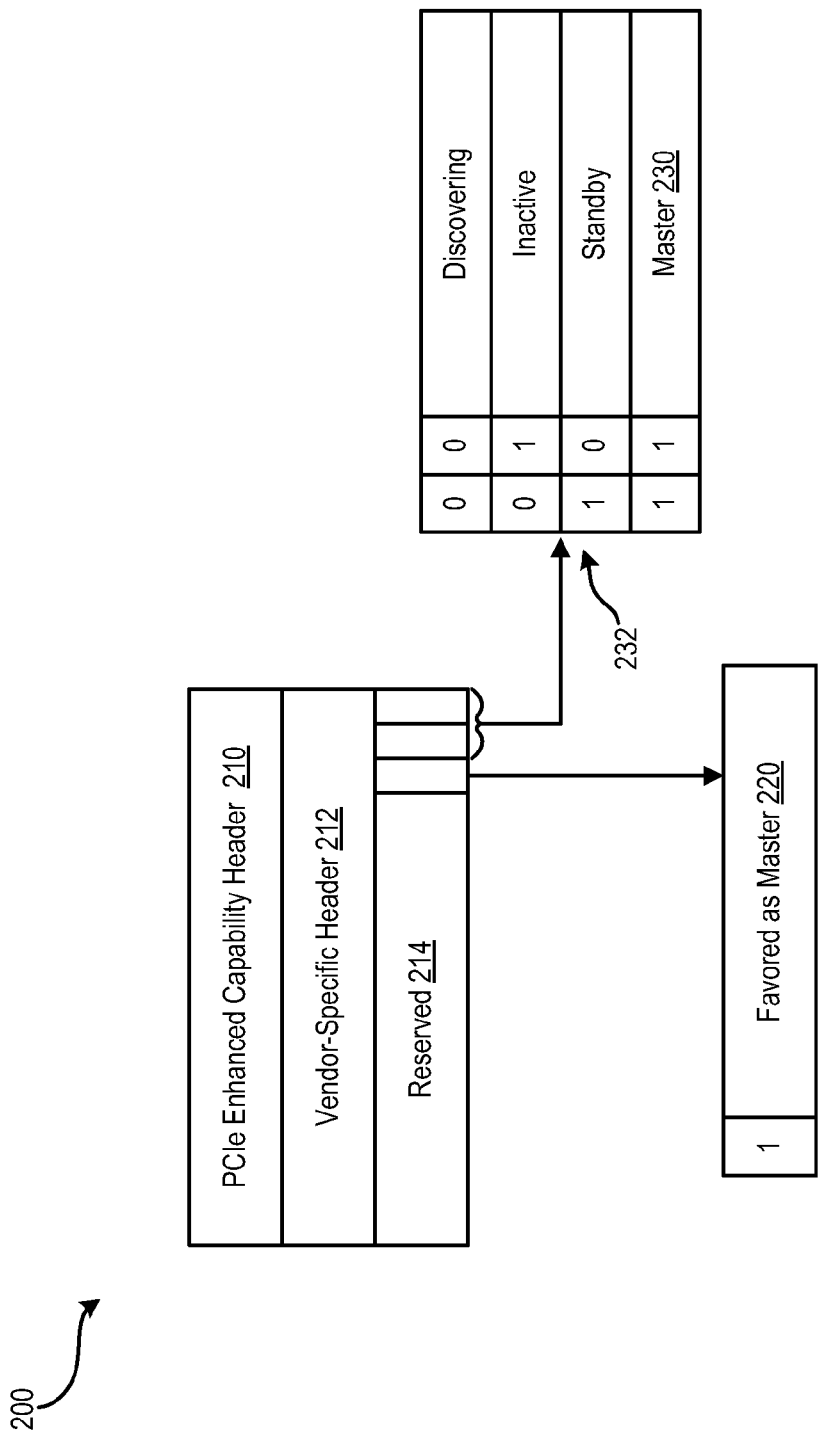
FIG. 2 shows a block diagram of certain bits that are set within each single root PCI manager.

Referring to FIG. 2, a block diagram of certain bits 200 that are set within each single root PCI manager is shown. A SR-PCIM indicates its presence in the PCI architecture by setting the certain vendor-specific state indicia. In certain embodiments, the state indicia are implemented within a vendor specific register in the PCIe extended capability space in accordance with the Vendor Specific Extended Capability (VSEC) specification published by the PCI special interest group.

More specifically, each single root PCI manager includes a PCIe enhanced capability header 210, a vendor specific header 212, as well as a reserved portion 214. The bit-mapped field 214 includes a multi-master control indicia portion 220. The multi-master control indicia portion 220 includes a favored as master indication 230 as well as a plurality of master state indicia bits 232.

When the favored as master indication 230 is set, the single root PCI manager with which the indicia is associated is the master single root PCI manager. When the master state indicia bits 232 are set to 11, the single root PCI manager with which the indicia is associated is in a master state of operation. When the master state indicia bits 232 are set to 10, the single root PCI manager with which the indicia is associated is in a standby state of operation. When the master state indicia bits 232 are set to 01, the single root PCI manager with which the indicia is associated is in an inactive state of operation. When the master state indicia bits 232 are set to 00, the single root PCI manager with which the indicia is associated is in a discovering state of operation.

Figure 3:
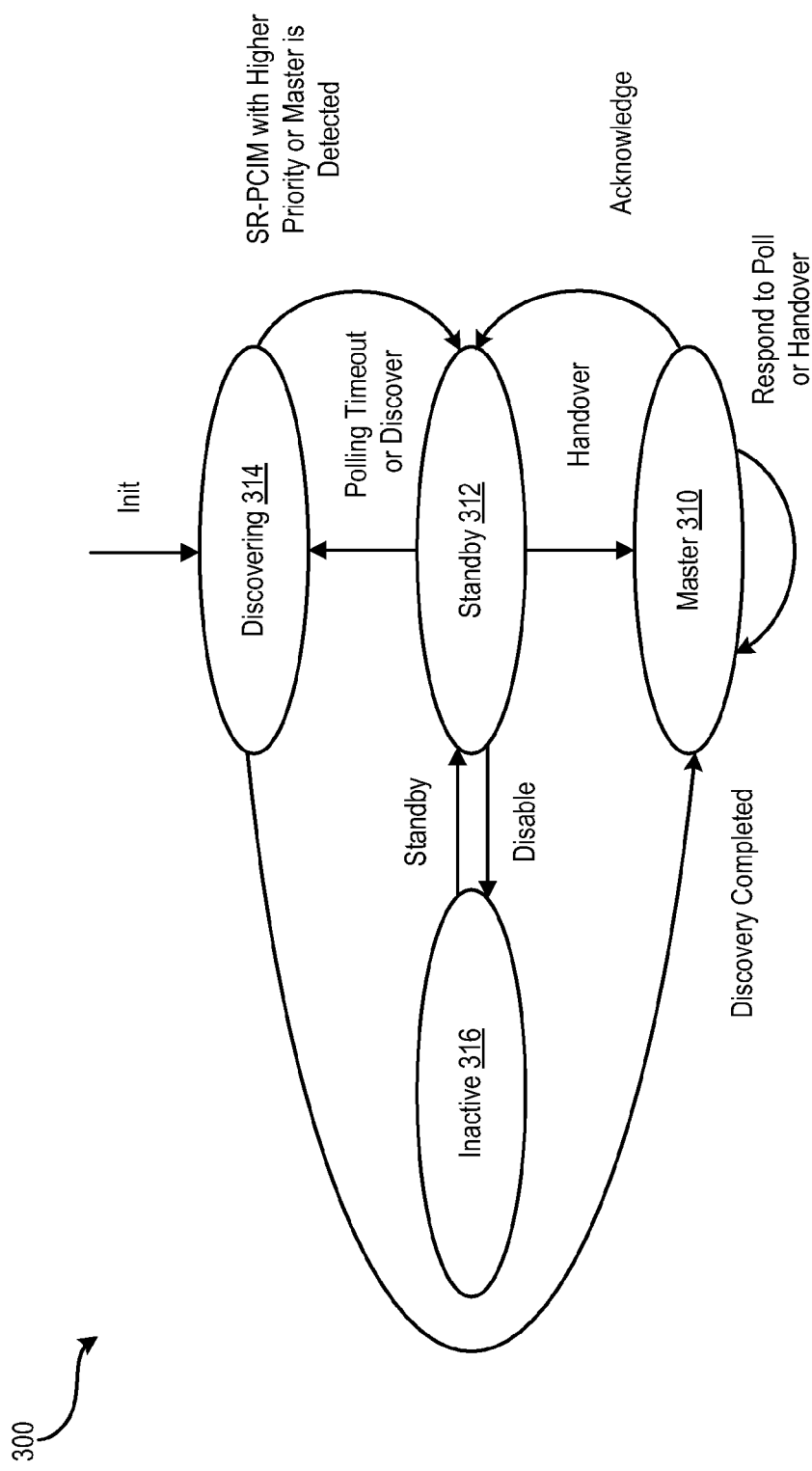
FIG. 3 shows a state machine of the operation of a single root PCI manager.

Referring to FIG. 3, a state machine of the operation of a single root PCI manager is shown. Every SR-PCIM within the system 100 is in a particular state. The states include a master state 310, a standby state 312, a discovering state 314 and an inactive state 316. The state of a particular SR-PCIM is defined by the master state indicia bits 232.

In operation, a PCIe requestor ID (RID) is used to determine which PCIM becomes the master. The device with the smallest RID is elected as the master to establish priority and mastership among multiple PCIMs. Alternatively, the device with the largest RID may be elected as the master.

However, the device or root complex that is programmed with the favored as master indicia supersedes the RID based election rule. Each standby SR-PCIM is ready to become master if and when a current master fails. Also, mastership can be handed over when the master detects another SR-PCIM with a higher priority. Additionally, under certain circumstances, e.g., when the number of standby SR-PCIMs becomes an obstacle to scalability, then a master SR-PCIM may force other SR-PCIMs to become inactive.

When the SR-PCIM is executing the state machine 300, a SR-PCIM complies during an initialization operation and becomes a master device, a standby device or an inactive device. The state machine 300 ensures that there is only one master SR-PCIM in the PCIe architecture at any time. Additionally, the state machine 300 specifies how a single master SR-PCIM is maintained during addition and removal of additional SR-PCIM.

During operation, a plurality of control messages are exchanged between SR-PCIMs to select or transition from one state to another. More specifically, a Handover control message is used to initiate the process of handing over mastership to a higher priority standby SR-PCIM or master SR-PCIM. An Acknowledge control message is used to acknowledge the Handover has occurred. A Disabled control message is used to disable a Standby SR-PCIM. A Standby control message is used to return a non-active SR-PCIM to a Standby state. A Discover control message causes a standby SR-PCIM to perform a discovering operation.

The discovering state 314 is an initial state that a SR-PCIM enters at startup. In the discovering state 314, a SR-PCIM sends repetitive messages to find all other SR-PCIMs in the architecture. A SR-PCIM in the discovering state 314 yields and changes its state to a standby state if it finds another SR-PCIM that either has its state set to a master state or is in a state other than the inactive state and has a higher priority than its own.

The standby state 312 maintains a SR-PCIM in a standby mode of operation. Standby SR-PCIMs do not configure or manage the PCIe IO virtualization end points. Every SR-PCIM that is in the standby state periodically polls the master SR-PCIM. As long as the SR-PCIM that is in the standby state determines that the master SR-PCIM is alive, the SR-PCIM that is in the standby state remains in standby state. The interval between polling can vary. If the SR-PCIM that is in the standby state does not receive a response within a reasonable amount of time and within the number of preset retries, then the SR-PCIM that is in the standby state concludes that the master is no longer alive and it changes its state to the discovering state 312.

If, while in the standby state, a SR-PCIM receives a Discover message or a Disable message, then the SR-PCIM transitions to either the discovering state 314 or the inactive state 316, respectively. If, while in the standby state 312, a SR-PCIM receives a Handover message, the SR-PCIM transitions to the master state 310 and assumes the role of a master. The device that is in the standby state then sends the current master an Acknowledge message upon which the current master transitions its state to a standby state and stops responding to polling messages from standby SR-PCIMs.

The inactive state 316 maintains a SR-PCIM in an inactive mode of operation. If, while in the inactive state 316, a SR- PCIM receives a Standby message, then the SR-PCIM transitions to the standby state 312.

The master state 310 maintains a SR-PCIM in a master mode of operation. A SR-PCIM that is operating in the master mode of operation (i.e., a master SR-PCIM) performs periodic sweeps to determine whether any new SR-PCIMs have joined the architecture. If during the discovery operation, a SR-PCIM that is operating in the master state 310 identifies another SR-PCIM that is operating in the master state 310, where the other SR-PCIM has a lower priority, the SR-PCIM that is operating in the master mode of operation stops the discovery operation and waits for the other SR-PCIM that is operating in the master mode of operation to relinquish control of its authority.

If during the discovery operation, the SR-PCIM that is operating in the master mode of operation identifies a SR-PCIM that is in a state other than the inactive state and has a higher priority, the SR-PCIM that is operating in the master mode of operation completes the discovery operation to determine a highest priority SR-PCIM. The SR-PCIM that is performing the discovery operation (i.e., the master SR-PCIM) then and relinquishes control to SR-PCIM having the highest priority by sending a Handover message to that SR-PCIM.

On most implementations, the master SR-PCIM runs on a host environment in conjunction with a virtual machine monitor (VMM). However, it is possible for a SR-PCIM to run on a PCIe downstream device or some type of a co-processor. The favored as master indication preserves this flexibility so that a user can identify a specific device to override the mastership election process.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for allowing coexistence of a plurality of peripheral component interconnect (PCI) managers in a PCI Express system comprising:
    identifying one of the plurality of PCI managers as a master PCI manager;
    operating the master PCI manager in a master mode of operation; and
    setting each other PCI manager of the plurality of PCI managers in a state chosen from an Inactive state and a Standby state; and wherein,
    the PCI Express system is a single root PCI express system; and,
    each of the plurality of PCI managers comprise single root PCI managers.

2. The method of claim 1 wherein
    each of the plurality of PCI managers comprise a multi master control indicia portion, the multi master control indicia portion of each of the plurality of PCI managers indicating an operating state of a respective PCI manager.

3. The method of claim 2 wherein
    the multi master control indicia portion comprises a favored as master indication, the favored as master indication indicating whether a particular PCI manager is to operate as the master PCI manager.

4. The method of claim 2 wherein
    the multi master control indicia portion comprises a master state indicia portion, the master state indicia portion indicating the operating state of the respective PCI manager.

5. The method of claim 1 further comprising:
    exchanging a plurality of control messages between the plurality of PCI managers, the plurality of control messages controlling operational states of each of the plurality of PCI managers.

6. The method of claim 5 wherein:
    the plurality of control messages comprise
    a handover control message, the handover control message initiating a process of handing over mastership to a higher priority PCI manager,
    an acknowledge control message, the acknowledge control message acknowledging that a handover has occurred;
    a disable control message, the disable control message disabling a PCI manager that is operating in a standby mode of operation;
    a standby control message, the standby control message causing an inactive PCI manager to transition to the standby state; and,
    a discover control message, the discover control message causes a PCI manager that is operating in the standby state to perform a discovering operation.

7. An apparatus for allowing coexistence of a plurality of peripheral component interconnect (PCI) managers in a PCI Express system comprising:
    means for identifying one of the plurality of PCI managers as a master PCI manager;
    means for operating the master PCI manager in a master mode of operation; and means for setting each other PCI manager of the plurality of PCI managers in a state chosen from an Inactive state and a Standby state; and wherein, the PCI Express system is a single root PCI express system; and, each of the plurality of PCI managers comprise single root PCI managers.

8. The apparatus of claim 7 wherein each of the plurality of PCI managers comprise a multi master control indicia portion, the multi master control indicia portion of each of the plurality of PCI managers indicating an operating state of a respective PCI manager.

9. The apparatus of claim 8 wherein the multi master control indicia portion comprises a favored as master indication, the favored as master indication indicating whether a particular PCI manager is to operate as the master PCI manager.

10. The apparatus of claim 8 wherein the multi master control indicia portion comprises a master state indicia portion, the master state indicia portion indicating the operating state of the respective PCI manager.

11. The apparatus of claim 7 further comprising:

means for exchanging a plurality of control messages between the plurality of PCI managers, the plurality of control messages controlling operational states of each of the plurality of PCI managers.

12. The apparatus of claim 11 wherein:

the plurality of control messages comprise a handover control message, the handover control message initiating a process of handing over mastership to a higher priority PCI manager, an acknowledge control message, the acknowledge control message acknowledging that a handover has occurred;

a disable control message, the disable control message disabling a PCI manager that is operating in a standby mode of operation;

a standby control message, the standby control message causing an inactive PCI manager to transition to the standby state; and, a discover control message, the discover control message causes a PCI manager that is operating in the standby state to perform a discovering operation.

13. An information handling system comprising a processor;

memory coupled to the processor, the memory storing a system for allowing coexistence of a plurality of peripheral component interconnect (PCI) managers in a PCI Express system, the system comprising instructions executable by the processor for:

identifying one of the plurality of PCI managers as a master PCI manager;

operating the master PCI manager in a master mode of operation;

setting each other PCI manager of the plurality of PCI managers in a state chosen from an Inactive state and a Standby state; and wherein, the PCI Express system is a single root PCI express system; and, each of the plurality of PCI managers comprise single root PCI managers.

14. The information handling system of claim 13 wherein each of the plurality of PCI managers comprise a multi master control indicia portion, the multi master control indicia portion of each of the plurality of PCI managers indicating an operating state of a respective PCI manager.

15. The information handling system of claim 14 wherein the multi master control indicia portion comprises a favored as master indication, the favored as master indication indicating whether a particular PCI manager is to operate as the master PCI manager.

16. The information handling system of claim 14 wherein the multi master control indicia portion comprises a master state indicia portion, the master state indicia portion indicating the operating state of the respective PCI manager.

17. The information handling system of claim 13 wherein the system further comprises instructions for:

exchanging a plurality of control messages between the plurality of PCI managers, the plurality of control messages controlling operational states of each of the plurality of PCI managers.

18. The information handling system of claim 17 wherein:

the plurality of control messages comprise a handover control message, the handover control message initiating a process of handing over mastership to a higher priority PCI manager, an acknowledge control message, the acknowledge control message acknowledging that a handover has occurred;

a disable control message, the disable control message disabling a PCI manager that is operating in a standby mode of operation;

a standby control message, the standby control message causing an Inactive PCI manager to transition to the standby state; and, a discover control message, the discover control message causes a PCI manager that is operating in the standby state to perform a discovering operation.

* * * * *